(12) United States Patent
Ronneburger et al.

(10) Patent No.: US 6,857,411 B2
(45) Date of Patent: Feb. 22, 2005

(54) LUBRICATING OIL SUPPLY SYSTEM FOR THE CONNECTING ROD BEARINGS OF A CRANKSHAFT OF A MULTI-CYLINDER INTERNAL-COMBUSTION ENGINE

(75) Inventors: Ralph Ronneburger, Illingen-Schuetzingen (DE); Matthias Benz, Obersulm (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/635,907

(22) Filed: Aug. 7, 2003

(65) Prior Publication Data

US 2004/0103872 A1 Jun. 3, 2004

Related U.S. Application Data

(63) Continuation of application No. PCT/EP02/00604, filed on Jan. 23, 2002.

(30) Foreign Application Priority Data

Feb. 7, 2001 (DE) .......................................... 101 05 542

(51) Int. Cl.$^7$ ................................................. F01M 1/00
(52) U.S. Cl. .................................... 123/196 R; 74/605
(58) Field of Search ...................... 123/196 R; 184/6.5; 74/605; 384/288

(56) References Cited

U.S. PATENT DOCUMENTS 2,728,331 A * 12/1955 Louzecky et al. ....... 123/41.38
4,928,550 A    5/1990 Sakai et al. ................. 75/595
5,138,991 A    8/1992 Wojdyla ..................... 123/196
5,152,373 A   10/1992 Callies ....................... 184/6.5
5,163,341 A   11/1992 Murrish et al. ............... 74/595
5,799,547 A    9/1998 Agarrat ....................... 74/605
6,202,620 B1   3/2001 Yamaguchi ............. 123/196 R
6,332,443 B1  12/2001 Kaita ..................... 123/196 R

FOREIGN PATENT DOCUMENTS

DE  696 05 567    7/2000
FR     979 586    4/1951

* cited by examiner

Primary Examiner—Noah P. Kamen
(74) Attorney, Agent, or Firm—Crowell & Moring, LLP

(57) ABSTRACT

A lubricating oil supply system is provided for the connecting rod bearings of a crankshaft of a multi-cylinder internal-combustion engine. Oil ducts extend from the bearing journals to the crank pins of the crankshaft. Oil supply takes place by way of the main bearings of the crankshaft with the oil ducts extending from one main bearing or bearing journal respectively to the crank pins or connecting rod bearings in each case adjoining on both sides. Two oil bores are provided in the respective bearing journals of the crankshaft for the lubricating oil supply to the connecting rod bearings adjoining on the left and right. The two oil bores extend at an angle and, converging to an oil bore, extend to the two adjoining crank pins. The two oil bores interact with oil supply grooves provided in the main bearings for the lubricating oil supply. Particularly for a 6-cylinder opposed-cylinder engine, a reliable and secure lubricating oil supply is ensured while maintaining the bearing widths of the crankshaft required for absorbing the gas forces and inertial forces, respectively.

10 Claims, 2 Drawing Sheets

LUBRICATING OIL SUPPLY SYSTEM FOR THE CONNECTING ROD BEARINGS OF A CRANKSHAFT OF A MULTI-CYLINDER INTERNAL-COMBUSTION ENGINE

BACKGROUND AND SUMMARY OF THE INVENTION

This application is a continuation of PCT Application No. PCT/EP02t00604 filed Jan. 23, 2002, which claims priority to German Patent Application No. 101 05 542.0 filed on Feb. 7, 2001.

The invention relates to a lubricating oil supply system for the connecting rod bearings of a crankshaft of a multi-cylinder internal-combustion engine, in which oil ducts extend from bearing journal to crank pins of the crankshaft, and in which oil supply taking place by way of main bearings of the crankshaft. The oil ducts extend from one main bearing or bearing journal respectively to the crank pins or connecting rod bearings in each case adjoining on both sides.

German Patent Document DE 696 05 567 $T_2$ illustrates a crankshaft for a 4-cylinder in-line engine in the case of which, by way of the bearing journals or main bearings of the crankshaft, the lubricating oil supply to the crank pins or connecting rod bearings adjoining the main bearing on both sides takes place by way of oil bores made in the crankshaft. The central main bearing can remain free of oil supply bores or oil supply grooves as a result of supplying lubricating oil to two connecting rod bearings respectively by way of a crankshaft main bearing.

It is also known (see, for example, French Patent Document FR-PS 979 586) to provide partial oil supply grooves in the main bearing shells of the crankshaft. The partial oil supply grooves are arranged in a deviated manner with respect to the gas force plane. By way of two oil bores provided in the bearing journal of the crankshaft, a permanent lubricating oil supply to the connecting rod bearing can be ensured by way of the partial oil supply grooves. Simultaneously, the bearing fraction of the main bearing can be maintained in the direction of the gas force plane.

It is an object of the invention to provide a lubricating oil supply system for the connecting rod bearings of a crankshaft of a multi-cylinder internal-combustion engine in which, on the one hand, a secure and reliable lubricating oil supply to the connecting rod bearings of the crankshaft is ensured and, on the other hand, the main bearings of the crankshaft, which are more stressed, particularly in the high rotational speed range, can securely absorb the gas forces and inertia forces.

This object is achieved by providing a lubricating oil supply system of the type mentioned in which, in respective bearing journals of the crankshaft for the lubricating oil supply to the connecting rod bearings adjoining on the left and right, respectively, two oil bores respectively are provided. The two oil bores extend at an angle and, converging to a third oil bore, extend to two adjoining crank pins. The two oil bores interact with oil supply grooves provided in the main bearings for lubricating oil supply.

In a 6-cylinder opposed-cylinder engine with a 120° spark gap, it was found that, starting at a certain rotational speed level, the bearing forces acting upon the main bearings, in which the oscillating inertia forces transmitted on the left and on the right by the crank pins are not compensated, will clearly rise. At the same time, the bearing forces in the main bearings, whose adjoining pair of crank pins is mutually offset by a crank angle of 180°, remain essentially constant independently of the rotational speed because of the compensation of the oscillating inertia forces. The suggested lubricating oil supply concept for the connecting rod bearings takes this circumstance into account. The same width can simultaneously be maintained for all main bearings despite different bearing loads.

In order to maintain the bearing fraction of the main bearings responsible for the lubricating oil supply, it is suggested to provide these main bearings only with partial oil supply grooves which interact with two oil bores respectively provided in the bearing journal. Consequently, alternatingly, by way of one oil bore, respectively, a continuous lubricating oil supply to the connecting rod bearings is ensured. In this case, the oil supply grooves are arranged to deviate by approximately 90° with respect to the gas force plane so that the bearing fraction of the main bearings in the direction of the applied main forces is not reduced.

The following description and the claims contain additional advantageous further developments and improvements of the lubricating oil supply system for the connecting rod bearings of a crankshaft.

Other objects, advantages and novel features of the present invention will become apparent from the following detailed description of the invention when considered in conjunction with the accompanying drawings.

DETAILED DESCRIPTION OF THE DRAWINGS

Figure 1:
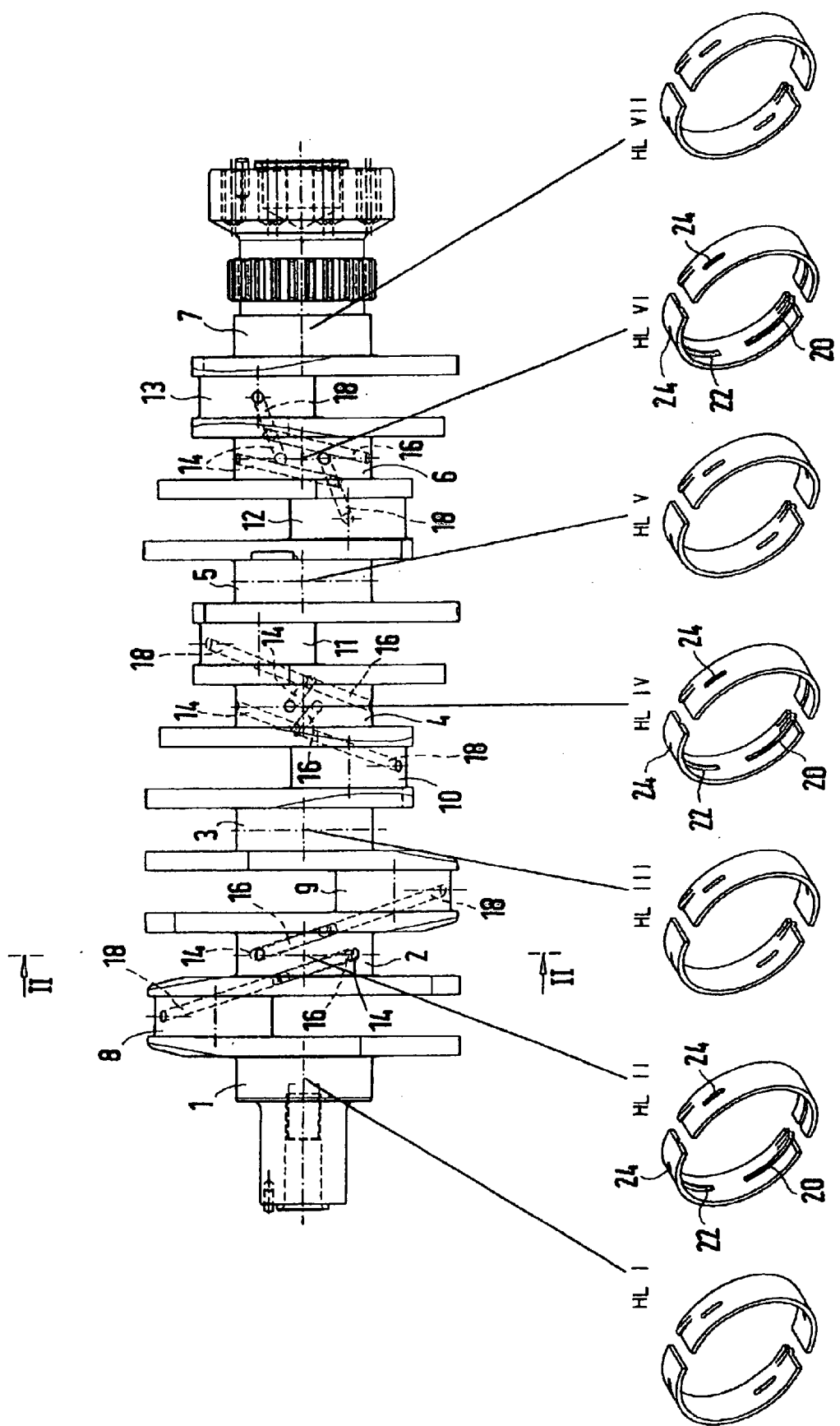
FIG. 1 is a view of a crankshaft of a multi-cylinder internal-combustion engine constructed according to a preferred embodiment of the present invention.
Figure 2:
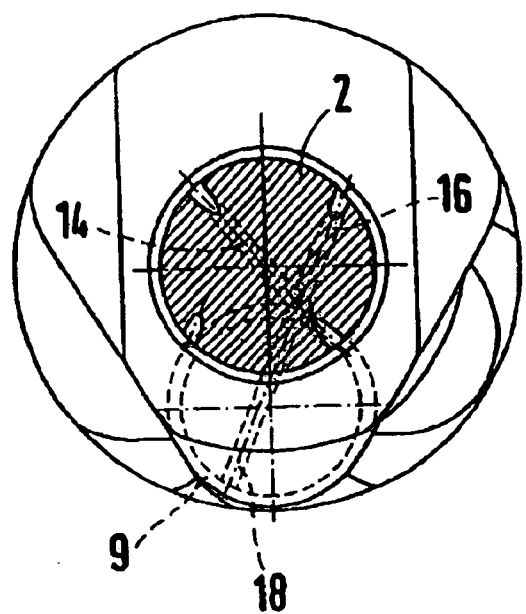
FIG. 2 is a sectional view along Line II—II in FIG. 1.

The crankshaft of a 6-cylinder opposed-cylinder engine illustrated in FIG. 1 has seven bearing journals 1 to 7 which are accommodated in main bearing shells HL I -HL VII. In this case, as generally known, the main bearing shells HL I - HL VII are received in corresponding bearing blocks of the crankcase (not shown) of the internal-combustion engine. The crankshaft has six throws, and the big ends of the connecting rods, which are not shown, are rotatably fastened to the crank pins 8 to 13. As customary in the case of a 6-cylinder opposed-cylinder engine with a 120° spark gap, the crank pins 8 and 9, 10 and 11, and 12 and 13 respectively adjoining the bearing journals 2, 4, and 6 are in each case arranged to be mutually offset by a 180° crank angle. These crank pairs, in turn, are in each case arranged to be mutually offset by a crank angle of 120°.

Two bores 14 and 16 respectively extending at an angle of 90° with respect to one another are arranged in each of the bearing journals 2, 4, and 6. The bores 14 and 16 converge to form an oil bore 18 which extends to a respective adjoining crank pin 8, 9, 10, 11, 12, or 13.

Figure 3:
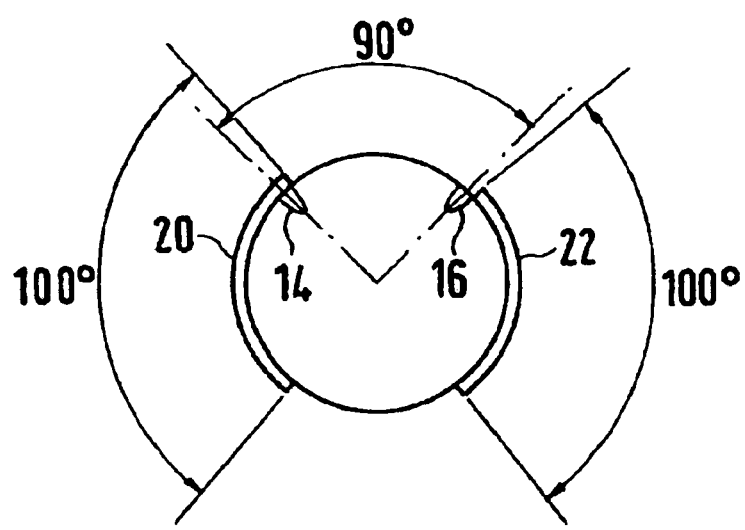
FIG. 3 is a schematic representation of the lubricating oil supply system in the area of a main bearing of the arrangement of FIG. 1.

Each of the main bearing shells HL II, HL IV and HL VI has two partial oil supply grooves 20 and 22 which, as illustrated in FIG. 3, extend along a circular-arc angle of 100° respectively. On the exterior side of the main bearing shells HL II, HL IV and HL VI, four exterior grooves 24 are respectively arranged. Only two of these grooves are shown here. The grooves are connected by way of a bore with the partial oil supply grooves 20 and 22 situated on the inside.

Each of the oil supply grooves 20 and 22 in the main bearing shells HL II, HL IV and HL VI is made such that it extends offset by 90° with respect to the gas force plane over an angle of approximately 100° in the installed condition of the crankshaft in the crankcase of the opposed-cylinder engine.

Supply of lubricating oil to the connecting rod bearings fastened to the crank pins 8 to 13 takes place as follows:

By way of a lubricating oil supply pump, which is not shown, the main bearings HL II, HL IV and HL VI are supplied with lubricating oil by way of oil bores arranged in the crankcase. For this purpose, the lubricating oil, by way of the oil grooves 24 arranged on the outside at the main bearing shells HL II, HL IV and HL VI, arrives in the partial oil supply grooves 20 and 22 provided on the interior side of the main bearing shells. The lubricating oil, in an alternating manner, arrives at the crank pins 8, 9 and 10, 11 and 12, 13 respectively by way of the oil bore 14 or 16 and by way of the oil bore 18. The lubricating oil emerging at the surface of the crank pins 8, 9 and 10, 11 and 12, 13 respectively is used for lubricating the connecting rod bearings rotatably fastened on the crank pins. Since the partial oil supply grooves 20 and 22 extend along an angular range of 100° and the two bores 14 and 16 are arranged at an angle of 90°, it is ensured that a permanent lubricating oil supply to the crank pins takes place at least by way of one of the two bores 14 and 16. On the other hand, the vectorially adding-up gas and inertia forces acting in the direction of the cylinder axis are reliably absorbed by the main bearing shell segments not provided with the oil supply grooves. These segments are not reduced in their bearing width with respect to the main bearing journals 1, 3, 5 and 7.

The bearing stresses in the main bearings HL II, HL IV and HL VI, caused by the oscillating inertia forces, remain almost constant independent of the rotational engine speed. However, the bearing forces acting upon the main bearings HL III and HL V, in particular, rise because of the non-existing balancing of masses proportionally to the rotational speed of the engine. As a result of the above-described system, on the one hand, a reliable lubricating oil supply to the connecting rod bearings is ensured. On the other hand, while maintaining a uniform bearing width for the crankshaft, the internal bearing forces acting upon the main bearings HL III and HL V are also reliably absorbed at a rotational speed level of n>7,000 1/min.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Lubricating oil supply system for connecting rod bearings of a crankshaft of a multi-cylinder internal-combustion engine, in which oil ducts extend from bearing journals to crank pins of the crankshaft, oil supply taking place by way of main bearings of the crankshaft,
   wherein the oil ducts extend from one main bearing or bearing journal respectively to the crank dins or connecting rod bearings in each case adjoining on both sides,
   wherein, in respective bearing journals of the crankshaft, for lubricating oil supply to the connecting rod bearings adjoining on the left and right, respectively, two oil bores respectively are provided which extend at an angle and, converging to a third oil bore, extend to two adjoining crank pins,
   wherein the two oil bores interact with oil supply grooves provided in the main bearings for the lubricating oil supply, and
   wherein the crankshaft is provided for a 6-cylinder opposed-cylinder engine, in which the two crank pins arranged adjacent to the bearing journals are arranged to be mutually offset by a crank angle of 180°.

2. Lubricating oil supply system according to claim 1, wherein the main bearings, two partial oil supply grooves are provided which are arranged to deviate by 90° with respect to the gas force plane.

3. Lubricating oil supply system according to claim 2, wherein the oil bores in the bearing journals of the crankshaft extend at an angle of approximately 90°, while the partial oil supply grooves extend along a range of a crank angle of approximately 100°.

4. Lubricating oil supply system according to claim 1, wherein the oil bores in the bearing journals of the crankshaft extend at an angle of approximately 90°, while the partial oil supply grooves extend along a range of a crank angle of approximately 100°.

5. Lubricating oil supply system for connecting rod bearings of a crankshaft of a multi-cylinder internal-combustion engine, in which oil ducts extend from bearing journals to crank pins of the crankshaft, oil supply taking place by way of main bearings of the crankshaft,
   wherein the oil ducts extend from one main bearing or bearing journal respectively to the crank pins or connecting rod bearings in each case adjoining on both sides,
   wherein, in respective bearing journals of the crankshaft, for lubricating oil supply to the connecting rod bearings adjoining on the left and right, respectively, two oil bores respectively are provided which extend at an angle and, converging to a third oil bore, extend to two adjoining crank pins,
   wherein the two oil bores interact with oil supply grooves provided in the main bearings for the lubricating oil supply, and
   wherein in the main bearings, two partial oil supply grooves are provided which are arranged to deviate by 90° with respect to the gas force plane.

6. Lubricating oil supply system according to claim 5, wherein the oil bores in the bearing journals of the crankshaft extend at an angle of approximately 90°, while the partial oil supply grooves extend along a range of a crank angle of approximately 100°.

7. Lubricating oil supply system for connecting rod bearings of a crankshaft of a multi-cylinder internal-combustion combustion engine, in which oil ducts extend from bearing journals to crank pins of the crankshaft, oil supply taking place by way of main bearings of the crankshaft,
   wherein the oil ducts extend from one main bearing or bearing journal respectively to the crank dins or connecting rod bearings in each case adjoining on both sides,
   wherein, in respective bearing journals of the crankshaft, for lubricating oil supply to the connecting rod bearings adjoining on the left and right, respectively, two oil bores respectively are provided which extend at an angle and, converting to a third oil bore, extend to two adjoining crank pins,
   wherein the two oil bores interact with oil supply grooves provided in the main bearings for the lubricating oil supply, and wherein the oil bores in the bearing journals of the crankshaft extend at an angle of approximately 90°, while the partial oil supply grooves extend along a range of a crank angle of approximately 100°.

8. A method of lubricating connecting rod bearings of a multi-cylinder internal combustion engine using a lubricating oil supply system for connecting rod bearings of a crankshaft of a multi-cylinder internal-combustion engine, in which oil ducts extend from bearing journals to crank dins of the crankshaft, oil supply taking place by way of main bearings of the crankshaft, wherein the oil ducts extend from one main bearing or bearing journal respectively to the crank sins or connecting rod bearings in each case adjoining on both sides, wherein, in respective bearing journals of the crankshaft, for lubricating oil supply to the connecting rod bearings adjoining on the left and right, respectively, two oil bores respectively are provided which extend at an angle and, converging to a third oil bore, extend to two adjoining crank pins, and wherein the two oil bores interact with oil supply grooves provided in the main bearings for the lubricating oil supply, comprising:

supplying lubricating oil under pressure to said main bearings, wherein the crankshaft is provided for a 6-cylinder opposed-cylinder engine, in which the two crank pins arranged adjacent to the bearing journals are arranged to be mutually offset by a crank angle of 180°.

9. A method of lubricating connecting rod bearings of a multi-cylinder internal combustion engine using a lubricating oil supply system for connecting rod bearings of a crankshaft of a multi-cylinder internal-combustion engine, in which oil ducts extend from bearing journals to crank sins of the crankshaft, oil supply taking place by way of main bearings of the crankshaft, wherein the oil ducts extend from one main bearing or bearing journal respectively to the crank pins or connecting rod bearings in each case adjoining on both sides, wherein, in respective bearing journals of the crankshaft, for lubricating oil supply to the connecting rod bearings adjoining on the left and right, respectively, two oil bores respectively are provided which extend at an angle and, converging to a third oil bore, extend to two adjoining crank pins, and wherein the two oil bores interact with oil supply grooves provided in the main bearings for the lubricating oil supply, comprising:

supplying lubricating oil under pressure to said main bearings, wherein in the main bearings, two partial oil supply grooves are provided which are arranged to deviate by 90° with respect to the gas force plane.

10. A method of lubricating connecting rod bearings of a multi-cylinder internal combustion engine using a lubricating oil supply system for connecting rod bearings of a crankshaft of a multi-cylinder internal-combustion engine, in which oil ducts extend from bearing journals to crank pins of the crankshaft, oil supply taking place by way of main bearings of the crankshaft, wherein the oil ducts extend from one main bearing or bearing journal respectively to the crank dins or connecting rod bearings in each case adjoining on both sides, wherein, in respective bearing journals of the crankshaft, for lubricating oil supply to the connecting rod bearings adjoining on the left and right, respectively, two oil bores respectively are provided which extend at an angle and, converging to a third oil bore, extend to two adjoining crank pins, and wherein the two oil bores interact with oil supply grooves provided in the main bearings for the lubricating oil supply, comprising:

supplying lubricating oil under pressure to said main bearings, wherein the oil bores in the bearing journals of the crankshaft extend at an angle of approximately 90°, while the partial oil supply grooves extend along a range of a crank angle of approximately 100°.

* * * * *